Aug. 22, 1950 R. KERSHAW 2,519,910
DERRICK
Filed Sept. 23, 1946 2 Sheets-Sheet 1
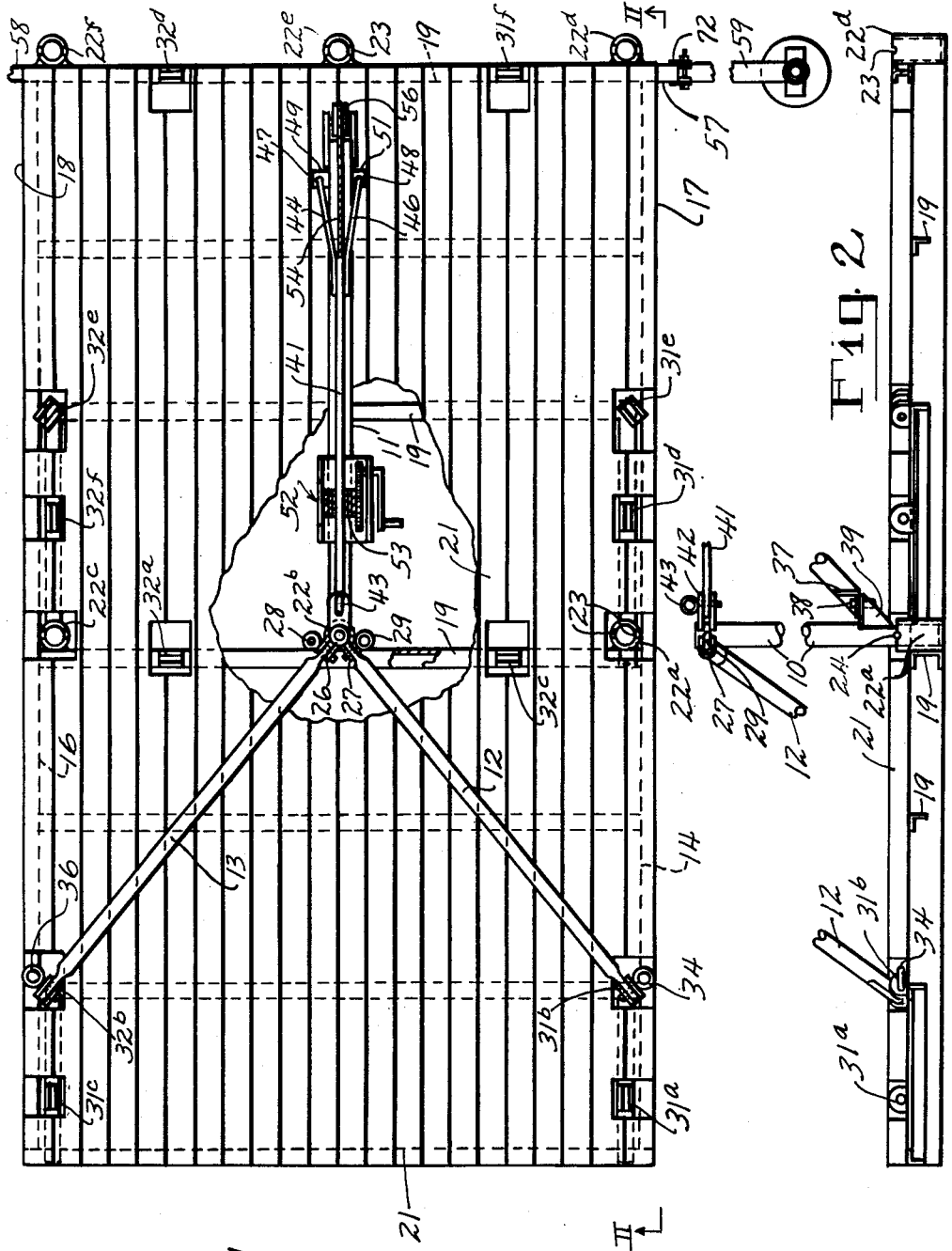
INVENTOR.
Royce Kershaw
BY
Henry L Jennings
ATTORNEY Aug. 22, 1950 R. KERSHAW 2,519,910
DERRICK
Filed Sept. 23, 1946 2 Sheets-Sheet 2
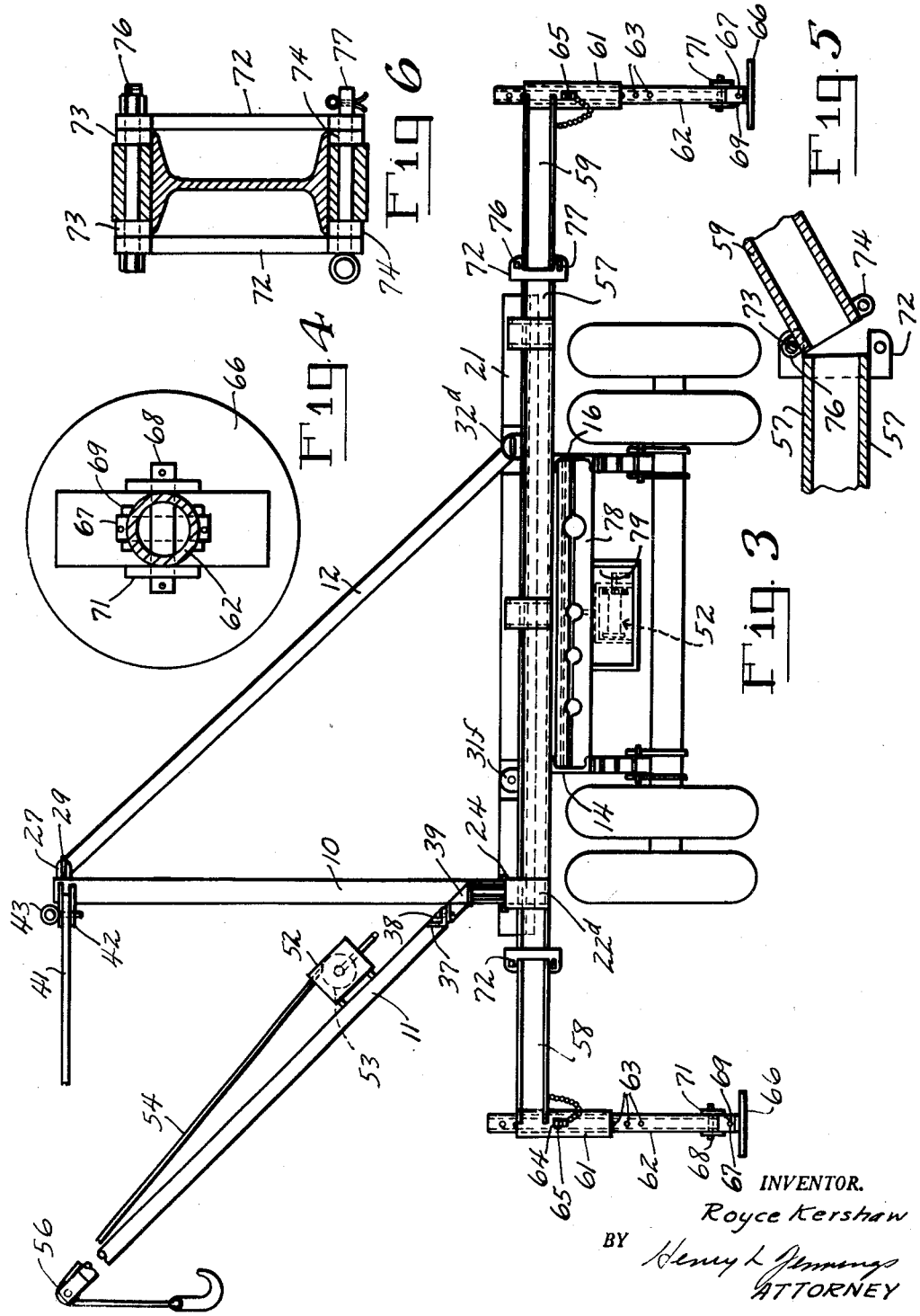
INVENTOR.
Royce Kershaw
BY
Henry L. Jennings
ATTORNEY Patented Aug. 22, 1950

2,519,910

UNITED STATES PATENT OFFICE 2,519,910

DERRICK

Royce Kershaw, Montgomery, Ala.

Application September 23, 1946, Serial No. 698,781

3 Claims. (Cl. 212—65)

This invention relates to a derrick for use on a road vehicle such as a highway motor truck and has for an object the provision of apparatus of the character designated which shall be relatively light in weight, easily mounted on the vehicle and dismounted therefrom and which shall be particularly useful in handling heavy articles such as heavy tools and road machinery.

A further object of my invention is to provide a derrick including the usual mast, boom, and guy members together with means for mounting the derrick at various positions on a highway vehicle.

A still further object of my invention is to provide a derrick adapted to be mounted on a highway vehicle in any one of a plurality of positions, together with extended adjustable supports on the sides of the vehicle to hold it against tilting.

Briefly, my invention comprises a derrick which is particularly adapted for mounting upon a highway vehicle, together with a highway vehicle having means thereon for removably supporting and attaching the derrick thereto. In particular, I provide in the deck of a highway vehicle, a plurality of sockets for receiving the mast of the derrick, which sockets are located at various points around the deck of the vehicle so that the derrick may be mounted at a point most convenient to handle the articles contemplated. The mast is maintained in a vertical position by means of guy rods which are removably connected to the top of the mast and to the frame of the vehicle, there being provided for this purpose a pair of clevises associated with each socket whereby the mast may be so supported in any selected position. Another important feature of my invention is the provision of extension beams at one end of the vehicle which are pivotally mounted thereon, but which may be secured in extended position, together with vertically adjustable supports for engagement with the ground to hold the vehicle against tilting when in use. When not in use, the derrick may be readily dismounted and stored in a compartment provided under the vehicle deck whereby the vehicle may again be used for ordinary purposes.

These and other features of my invention are illustrated in the accompanying drawing, forming a part of this application, in which Fig. 1 is a plan view of a highway vehicle having my improved derrick mounted thereon;

Fig. 2 is a side elevation, partly in section, and with parts broken away;

Fig. 3 is an end view thereof;

Fig. 4 is a detailed sectional plan view of the support for the extension beams; and Figs. 5 and 6 are detailed sectional views illustrating the pivotal mounting of the extension beam.

Referring now to the drawings for a better understanding of my invention, my improved derrick comprises a mast 10, a boom 11, and guy rods 12 and 13. The derrick is mounted upon a highway vehicle having a frame comprised of longitudinal frame members 14 and 16, which in turn support a decking frame made up of a plurality of longitudinal frame members 17 and 18 and the requisite transverse structural frame members 19. A decking 21, such as of hardwood, is mounted over the frame members 17, 18 and 19. The mast 10 is made of light, strong material such as a pipe section and is adapted to fit into any one of a plurality of sockets indicated by the numerals 22a, 22b, 22c, 22d, 22e, and 22f, which, as shown in Fig. 1, are disposed on the sides, across the ends, and between the sides of the vehicle frame. The sockets, as shown, are cylindrical in cross section to receive the lower end of the mast 10, and their upper ends are below the level of the deck 21. Each socket is provided at its top with opposed notches 23 for receiving a pin 24 in the lower end of the mast, and which thus retains the mast against turning.

Secured to the top of the mast are a pair of clevises 26 and 27, which receive the upper, flat ends of the guy rods 12 and 13, and removably secure the guy rods to the mast by means of pins 28 and 29. Associated with each of the sockets for receiving the mast 10, are a pair of clevises mounted on the frame members of the vehicle which are disposed to receive the lower ends of the guy rods 12 and 13. For example, with the mast 10 in the position shown in Fig. 1, in socket 22b, I show clevises 31b and 32b for receiving the lower ends of the guy rods 12 and 13 respectively, which guy rods are removably connected to said clevises by means of pins 34 and 36. Associated with the socket 22a are clevises 31a and 32a for receiving the lower ends of the guy rods. For socket 22d there are provided clevises 31d and 32d. For socket 22e there are provided clevises 31e and 32e. Also, for socket 22f there are provided clevises 31f and 32f. Likewise, for socket 22c there are provided clevises 31c and 32c, whereby the lower ends of the guy rods 12 and 13 may be connected thereto. It will thus be seen that I may mount the derrick on the vehicle in such position as to be most convenient for handling the articles or materials to be handled.

The boom 11 is preferably made from a pipe section and has welded to the lower end thereof an angle bracket 37, which carries a pin 38. A cooperating angle bracket 39 is mounted on the lower end of the mast and is provided with a hole for receiving the pin 38. By this mounting, the boom may be swung in any desired position about the mast 10. The upper end of the boom 11 is stayed by means of a boom guy rod 41, which is connected to a clevis 42, mounted on the upper end of the mast, by means of a pin 43. The outer end of the boom guy rod is divided as shown at 44 and 46, and is provided at its ends with hooks 47 and 48, which hook into brackets 49 and 51 carried by the outer end of the boom.

Mounted on the boom 11 is a power unit 52, which, for the purpose of illustration, is shown as a manual power unit but which may, if desired, be motor driven. Included in the power unit 52 is a drum 53 upon which is wound a cable 54. At the outer end of the boom 11 is a sheave 56, over which the cable 54 passes, and which may be employed to engage and lift articles, as is well understood.

At one end of the vehicle is secured an end beam 57. Pivotally mounted to the ends of the end beam 57 are two extension beams 58 and 59 adapted to assume the positions shown in Fig. 5. On the outer ends of the extension beams 58 and 59 are vertically adjustable supports each comprising telescoping cylindrical members 61 and 62. The member 62 is provided with a plurality of holes 63 and the member 61 is provided with a hole 64 for receiving a pin 65. By the means shown the supports may be adjusted vertically. At the lower end of each of the supports is a ground engaging foot 66, which is connected to the lower end by a universal joint comprising pins 67 and 68, passing through connecting yokes 69 and 71, at right angles to each other as shown in Fig. 4 of the drawing.

The pivotal mounting of the extension beams to the end beam is illustrated in Figs. 5 and 6 of the drawing. Secured to each end of the end beam 57 on opposite sides thereof are a pair of hinge members 72. The associated end of each extension beam is provided with an upper lug 73 and a lower lug 74, which lugs fit between the sides of the hinge members 72. A bolt 76 passes through hinge members 72 and the upper lug 73, and a removable pin 77 is employed to connect the lower end of the hinge members 72 to the lug 74. It will thus be seen that when not in use, the pins 77 may be withdrawn, and the extension beams 58 and 59 may be pivoted about the bolt 76 to a position where they are out of the way.

As shown in Fig. 3, I provide a support 78, extending across between the frames 14 and 16 to form a compartment between the support and the transverse frame members of the vehicle, for receiving the parts of the derrick when it is dismounted from the vehicle. This storage compartment is provided, as shown, with suitable recesses. In addition, I provide a compartment 79, underneath the support 78 for receiving the power unit 52.

From the foregoing description it will be apparent that I have devised an extremely simple, rugged derrick for association with a highway vehicle which may be readily mounted upon or dismounted therefrom. It will further be seen that the derrick may be mounted in any position most convenient for handling the articles or materials to be handled. For such articles as are heavy, as when handling heavy machinery, the extension beams 58 and 59 may be utilized as shown in Fig. 3 of the drawing to stabilize the derrick, and if such additional support is not required, these beams may be readily folded out of the way. When not in use, the derrick may be stored out of the way under the deck of the vehicle whereby the vehicle may be used for other purposes.

While I have shown my invention in but one form, it will be obvious to those skilled in the art that it is not so limited, but is susceptible of various changes and modifications, without departing from the spirit thereof, and I desire, therefore, that only such limitations shall be placed thereupon as are specifically set forth in the appended claims.

What I claim is:

1. In a derrick of the character described, a vehicle having a plurality of sockets mounted thereon, a mast adapted to fit in any one of the sockets, a pair of guy rods for the mast, and sets of connectors on the vehicle for the lower ends of the rods spaced equidistantly from each socket for removably connecting the lower ends of said guy rods to the vehicle with the mast mounted in any one of the sockets.

2. In a derrick of the character described, a vehicle having a frame, a socket mounted on the frame, a mast fitting in the socket, a pin and slot connection between the mast and socket to hold the mast against turning, a boom pivotally mounted on the lower end of the mast, a boom guy rod pivotally connected to the upper end of the mast and near the upper end of the boom, guy rods for the mast comprising a pair of rigid members, and a pair of clevises on the vehicle equidistantly spaced from the socket for removably connecting the guy rods thereto.

3. In a derrick for a highway vehicle having a frame and a decking covering the frame, a plurality of sockets disposed along the sides, across the ends and between the sides of the frame, a mast adapted to fit in any one of the sockets, means for holding the mast against turning when mounted in any of the sockets, a pair of rigid guy rods removably connected at one end to the top of the mast, a pair of clevises for each socket carried by the frame and equidistantly spaced from their associated socket for connecting the other ends of said guy rods thereto, said sockets and said clevises being below the level of the decking.

ROYCE KERSHAW.

REFERENCES CITED

The following references are of record in the file of this patent:

UNITED STATES PATENTS

| Number | Name | Date |
|---|---|---|
| Re. 12,867 | Marvin | Oct. 20, 1908 |
| 152,703 | Stevens | June 30, 1874 |
| 337,462 | Valentine | Mar. 9, 1886 |
| 733,128 | Bennett et al. | July 7, 1903 |
| 771,846 | Thompson | Oct. 11, 1904 |
| 1,529,069 | Lehman et al. | Mar. 10, 1925 |
| 1,860,774 | Erickson | May 31, 1932 |
| 2,375,264 | Wagner et al. | May 8, 1945 |